Feb. 21, 1939. M. R. FENSKE ET AL 2,147,786
APPARATUS FOR TREATING MINERAL OILS
Filed Nov. 14, 1933 5 Sheets-Sheet 3

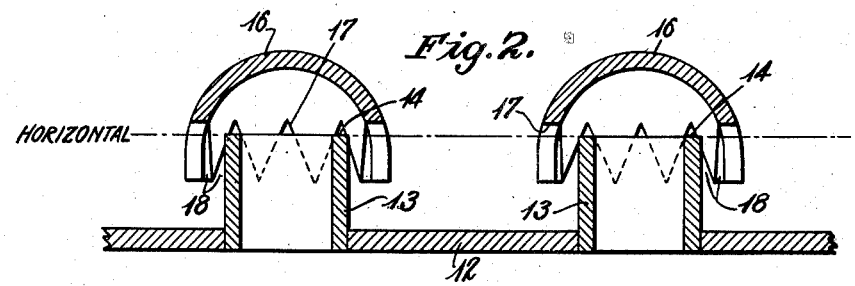
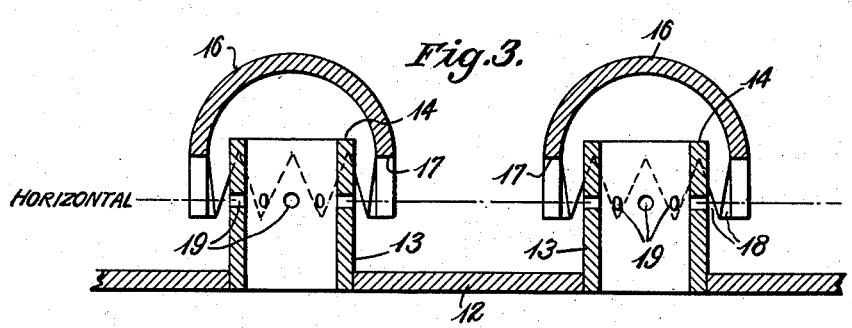
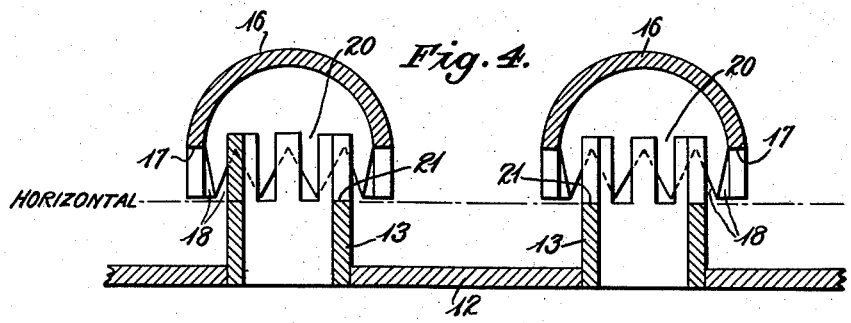
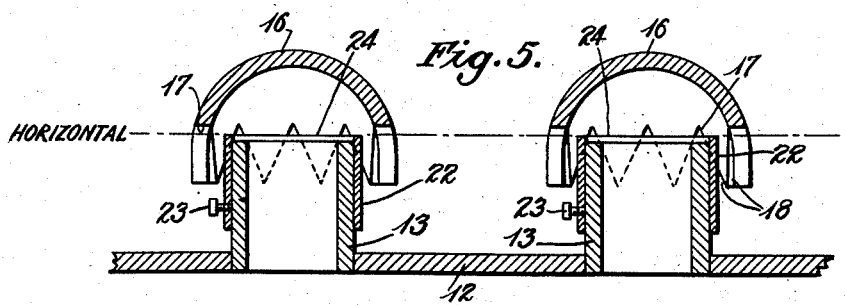

Inventors
Merrell R. Fenske
and Wilbert B. McCluer
By Hugo G. Kennman
Attorney

Feb. 21, 1939.   M. R. FENSKE ET AL   2,147,786
APPARATUS FOR TREATING MINERAL OILS
Filed Nov. 14, 1933   5 Sheets-Sheet 5

Inventors
Merrell R. Fenske
and Wilbert B. McCluer

By   Hugo G. Kennan   Attorney

Patented Feb. 21, 1939

2,147,786

UNITED STATES PATENT OFFICE 2,147,786

APPARATUS FOR TREATING MINERAL OILS

Merrell R. Fenske and Wilbert B. McCluer, State College, Pa., assignors to Pennsylvania Petroleum Research Corporation, a corporation of Pennsylvania Application November 14, 1933, Serial No. 697,990

9 Claims. (Cl. 23—270)

This invention pertains generally to the treatment of materials and pertains particularly to their treatment in a countercurrent system.

The invention will be described in connection with the solvent extraction and/or fractionation of mineral oils and particularly lubricating oils. However, it is to be understood that it may have many other uses.

In copending application, Serial No. 10,932, filed March 13, 1935, by Merrell R. Fenske and Wilbert B. McCluer, which has matured into Patent 2,037,318 dated April 14, 1936, is described a process and apparatus for the extraction and/or fractionation of mineral oils wherein two or more liquids of different densities are flowed countercurrently to each other by virtue of differences in their densities. The types of apparatus described in said copending application employ columns of the order of distillation or fractionation columns.

In practicing said invention the liquids may enter the column at points which are spaced vertically along said column, and the liquid entering at any point is made to flow upwardly or downwardly depending on whether it is lighter or heavier than the liquid or liquids in said column adjacent said point of entry. Unless complete solution is effected at least one light solution of the liquids is taken off from the column at the top thereof and a least one heavy solution of the liquids is taken off from the column at the bottom thereof.

If more than one solvent is employed, the solvents may be mixed prior to their introduction into the column or one or more of the solvents may be mixed with the oil prior to its introduction into the column, or one or more of the solvents may be fed into the column at a separate point or points.

The invention herein relates particularly to new and novel apparatus for carrying out the above-mentioned process.

The invention herein in its more specific phases pertains to a column of relatively large diameter and to a method and means for attaining and maintaining a substantially equal distribution of one or more of the countercurrently flowing fluids, whether one or more of said fluids is in the liquid or in the vapor phase.

The method and means employed for substantially equally distributing and redistributing the fluids is of a character which may be combined with packing material to form a packed column of relatively large diameter and yet of relatively high efficiency.

By substantially equally distributing and redistributing the fluids, serious channeling of the fluids through the packing material is avoided and thus one of the greatest objections to the use of packed columns in sizes suitable for plant operation has been overcome.

Further features of the invention reside in the construction, arrangement and combination of parts, and in the steps, sequences, and combinations of steps, all of which together with other features will become more apparent to persons skilled in the art as the specification proceeds and upon reference to the drawings in which like reference characters have been appended to like parts in the various figures and in which:

Figure 2 is a section shown broken through a bubble cap plate;

Figure 3 is a section shown broken through a bubble cap plate showing a modified cap and tube arrangement;

Figure 4 is a section shown broken of a further form of cap and tube arrangement;

Figure 5 is a section shown broken illustrating a further form of cap and tube arrangement;

Since the invention may be readily adapted to a tower of the bubble cap type, it will be described in connection therewith. However, it is to be understood that the invention may be embodied in other forms of apparatus.

Figure 1:
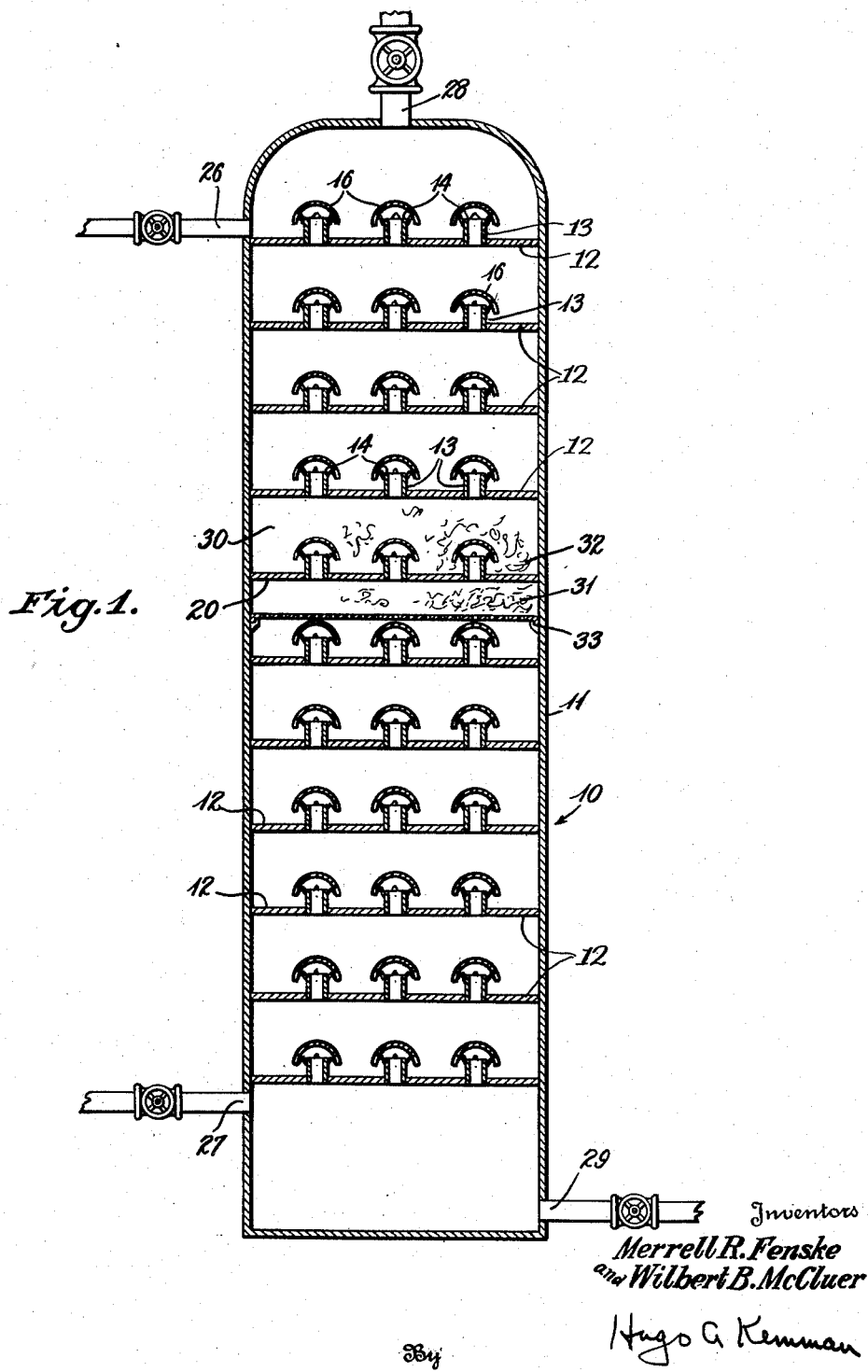
Figure 1 is a diagrammatic illustration of a tower of the bubble cap type which has been adapted to the invention.

Referring now more particularly to Figure 1 at 10 is shown a tower comprising a shell 11 having a plurality of plates 12 of the bubble cap type mounted therein. The tower 10 may correspond in all respects to a tower of the bubble cap type, except that the usual overflow arrangement from each plate to the next lower is preferably omitted or plugged so that both the downflowing and upflowing fluids are caused to pass through the tubes 13 on plates 12.

The upper edges 14 of the tubes 13 of each plate 12 may be brought into substantially the same horizontal plane for purposes which will hereinafter appear.

The term "substantially" as used herein in connection with the term "horizontal plane" has a broad significance so as to include a horizontal plane.

The purpose of bringing the edges 14 on each plate 12 into a horizontal plane is to cause the downwardly flowing fluid, which will accumulate around the tubes 13 of each plate, to overflow the edges 14 substantially equally. A plurality of weirs or metering devices of substantially equal capacity is thus provided on each plate 12, and since the tubes 13 are generally substantially equally distributed in each plate 12, these weirs or metering devices will be substantially equally distributed transversely of the tower 10.

All or a large part of the downflowing fluid (whether liquid or vapor) is caused to overflow the edges 14 on each plate and such fluid is thus substantially equally distributed and redistributed as it passes down through the tower 10.

The upflowing fluid (whether liquid or vapor) is also substantially equally distributed and redistributed since the tubes 13 are of substantially equal diameter. This will be especially true if the caps 16 are uniformly arranged with respect to the tubes 13 so that the resistance to fluid flow at each cap will be substantially the same.

Thus each tube 13 forms a pair of weirs or metering devices arranged back to back, each end of a tube 13 being a weir or metering device.

When the upwardly flowing fluid is a vapor, such as is the case when the tower is used for distillation purposes, no change need be made in the spacing between the caps 16 and the tubes 13 to permit the two fluids to pass under each cap 16, although the caps might be raised, particularly if it is desired to reduce the pressure drop through the column. However, when two liquids flow countercurrently to each other through the tower, care must be taken to see that these liquids do not lock or in other words become trapped underneath the caps 16. In the event that the liquids lock underneath the caps 16, it is merely necessary to raise the caps so as to bring the bottoms 17 of notches 18 in caps 16 above the edges 14 of the tubes 13. This is illustrated in Figure 2.

If it is not possible to raise the caps 16 or if for any reason this is not desired, any other means may be provided to avoid locking of the two liquids. For instance, as seen in Figure 3, a plurality of holes may be drilled in the tubes 13. The centers of the holes 19 in the tubes 13 of any one plate 12 may be in substantially the same horizontal plane and the holes 19 may be of the same diameter and number in each tube 13.

When the centers of the holes 19 are in substantially the same plane on each plate 12, when holes 19 are of substantially the same size, and when each tube 13 has the same number of holes, equal amounts of the downflowing liquid will flow downwardly through each tube 13 and the level of the downflowing liquid will be at the holes 19 on each plate 12. As seen in Figure 3, holes 19 are below the level of the bottoms 17.

Other arrangements for the holes may be provided so as to convert the tubes 13 into double weirs or metering devices of substantially equal capacity.

Another way of avoiding the locking or trapping of two countercurrently flowing liquids at the caps is to cut a plurality of vertical slots 20 in the tubes 13, said slots 20 being of equal number and size in each tube. The bottoms 21 of the slots are illustrated as being in substantially the same horizontal plane, which plane is below that of the bottoms 17 of notches 18.

To bring the tops 14 of the tubes 13 into substantially the same horizontal plane after a tower has already been constructed may require considerable cutting or grinding of the ends of the tubes 13 in the event that they are not already in a horizontal plane. A somewhat simpler way of accomplishing the same objective is to fit each tube 13 with a closely fitting outer sleeve 22. Sleeve or collar 22 may be provided with an adjustment screw 23 so that the top edges 24 of the sleeves 22 on each plate 12 may be brought into substantially the same horizontal plane.

Although each sleeve or collar 22 is shown on the outside of its tube 13 it may be fitted on the inside thereof as will be obvious.

Tower 10 is illustrated as having an inlet 26 for heavier liquid, an inlet 27 for lighter liquid, an outlet 28 for lighter solution, and an outlet 29 for heavier solution, and may have any desired number of plates.

When the tower 10 is used for solvent extraction and/or fractionation purposes, if the oil is heavier than the solvent, it will generally be fed in at 26. In this case the solvent will be fed in at 27. Due to the difference in their densities, these two liquids will flow countercurrently through the tower 10 and will be equally distributed and redistributed transversely of the tower at each plate 12.

Unless complete solution is effected the solvent will dissolve a part of the oil to generally form a light solution which will be taken off at 28 and the oil will dissolve a part of the solvent to generally form a heavy solution which will be taken off at 29.

If the solvent is heavier than the oil the feeding of the two is merely reversed.

Since equal distribution is attained at each plate 12, the space 30 between each pair of adjacent plates 12 may be partially or completely filled with any suitable packing material which is illustrated at 31. The packing 31 may be supported in the spaces 30 by any suitable means, for instance, by the plates 12 as illustrated at 32 or by providing a perforated transverse support illustrated at 33, or otherwise, and is preferably substantially equally distributed transversely of the tower so as to have substantially uniform characteristics along any vertical line therethrough.

Any desired type of packing may be employed, for instance, jack chain. However, packings which are found to be extremely efficient are described and claimed in copending application, Serial No. 677,755 filed June 26, 1933, which has matured into Patent 2,037,317 dated April 14, 1936. These packings comprise single turn, double turn, triple turn, and polyturn helixes, carding teeth such as used in the textile industry, open rings, S-shaped, H-shaped, and #-shaped wire forms, bent carding teeth, etc. The sizes of the packing elements may be generally comparable to those of carding teeth but may have other sizes depending upon the results desired. This type of packing affords a very high surface area, together with a very high percentage of free space, and is extremely efficient for contact purposes.

Figure 6:
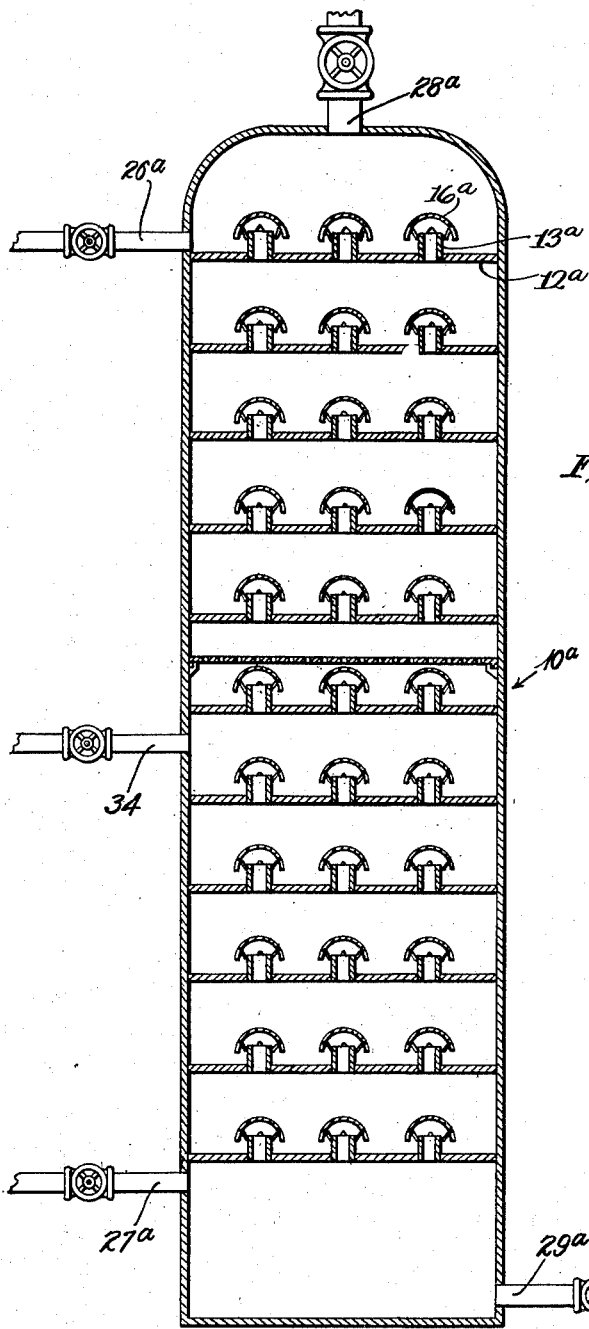
Figure 6 is a diagrammatic illustration of another tower of the bubble cap type.

The form of the invention illustrated in Figure 6 may be in all respects similar to that illustrated in Figure 1, with the exception that an inlet 34 is provided intermediate the ends of the tower 10a.

The purpose of the inlet 34 is to adapt the apparatus more particularly to certain modes of operation described in copending application, Serial No. 10,932 filed March 13, 1935.

Briefly, inlet 34 is for the purpose of introducing a third liquid into the tower 10a. For instance, when two solvents are employed, one heavier than and the other lighter than the oil, the heavier solvent might be introduced at 26a, the lighter solvent at 27a, and the oil at 34, in which case the oil will tend to travel downwardly in the light solvent and upwardly in the heavy solvent; the light solvent will tend to travel upwardly in the heavy solvent and in the oil; the heavy solvent will tend to flow downwardly in the oil and the light solvent, and all three liquids, if partially miscible, will form at least two tertiary solutions the lighter of which will be taken off at 28a and the heavier at 29a.

Or the oil might be fed in at 26a, one solvent at 34, and a second solvent at 27a, particularly in cases in which the oil is heavier than the solvents. Or, in the latter case, the oil might be fed in at 34, the lighter solvent at 27a, and the heavier solvent at 26a, particularly when the heavier solvent is heavier than the light solution.

The oil might be fed in at 27a, one solvent at 34, and another at 26a, particularly when the oil is lighter than both solvents. In the latter case, the lighter of the solvents could be fed in at 27a, the oil at 34, and the heavier solvent at 26a, particularly if the lighter solvent is lighter than the heavier solution.

Other methods of feeding the column will suggest themselves to persons skilled in the art upon becoming familiar herewith.

The term solvent is used here in a broad sense and includes any liquid regardless of its effect upon introduction into the column. For instance, the second solvent may be selective as to the same or a different type of molecule than the first; or one or both of the solvent might be selective chiefly as to size of molecule; or the second solvent may have a relatively low miscibility with the oil to cause precipitation of the oil. Furthermore, the term solvent includes solvent mixtures.

During all the movements of the various liquids, the equal distribution and redistribution feature is in operation.

Figure 7:
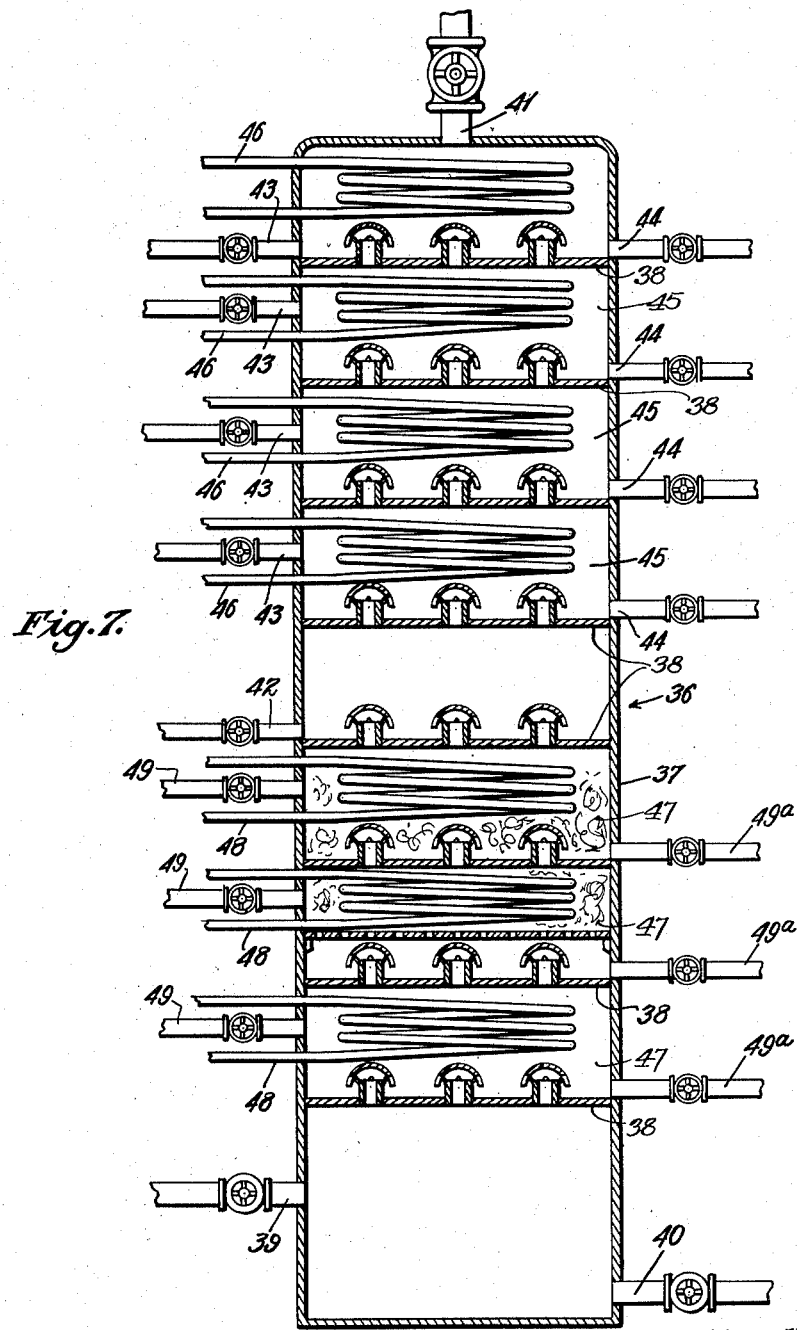
Figure 7 is a diagrammatic illustration of a further form of tower.

The column 36 illustrated in Figure 7 is more particularly adapted for practicing certain modes of operation of said copending application, Serial No. 10,932 filed March 13, 1935, and comprises a shell 37 having a plurality of plates 38, the arrangement of which may be comparable to that in the ordinary bubble cap tower.

Tower 36 is illustrated as having an inlet 39 for light liquid, an outlet 40 for heavy solution, an outlet 41 for light solution, an inlet 42 for heavy liquid, and an inlet 43 and an outlet 44 between each pair of plates 38 above the inlet 42. The space 45 between each pair of the latter plates 38 may contain a heat exchange coil 46 or may be provided with other suitable heat exchange means. The space 47 between each pair of plates 38 below inlet 42 might likewise be provided with heat exchange means 48 and inlets 49 and outlets 49a if desired.

Any one or more of the outlets 44 may serve for the purpose of taking off a side stream, and any one or more of the inlets 43 may serve for the purpose of introducing a third liquid, for instance, to cause precipitation of dissolved oil.

Any one or more of the outlets 49a might also be used for taking off a sidestream and any one or more of the inlets 49 might be used for introducing a third liquid into the solution zone for any of the purposes above referred to.

The tower 36 is particularly adapted for use when the oil is heavier than the solvent, since sidestreams of oil are generally of more interest than sidestreams of solvent. In this case the oil may be introduced at 42 and the solvent at 39.

The oil will flow downwardly and the undissolved portion, if any, will be withdrawn in solution form at 40. The solvent will flow upwardly and solution between oil and solvent will be effected between inlets 39 and 42 with or without the aid of the heat exchange means 48, as desired. The solvent or more correctly the solvent-oil solution continues to flow upwardly after it passes the inlet 42 and when it reaches the first space 45 a part of the dissolved oil may be precipitated, if desired, either by cooling the solution (for instance, by means of the coil 46 in this space) or by the introduction into this space through the inlet 43 of a precipitating liquid, or both. A precipitating liquid will generally be one which has a low miscibility with the oil but a relatively high miscibility with the solvent.

The oil precipitated in the first space 45 collects on the lower plate 38 bounding such space and a part or all of the precipitate may be withdrawn through a sidestream at 44.

Any desired portion of the precipitate may be withdrawn and the rest will be refluxed or in other words will be returned to the sphere of solution of solvent and oil. This is because the precipitate unless wholly withdrawn will build up on the respective plate 38 and will overflow the upper edges of the tubes 47 thereof.

Further precipitation may take place in each succeeding higher space 45 and sidestreams may be obtained through the respective outlets 44 with or without refluxing as desired.

The refluxed oil will likewise be distributed and redistributed as it descends through the column.

It will be understood that any number of spaces 45 for precipitation purposes may be provided and that any or all of the spaces 45 may or may not be packed as desired. The same is true of the spaces 47.

If desired, the packing elements introduced into the spaces 45 and/or 47 may be integrally jointed together and/or to the coils 46 and/or 48 respectively for efficient, rapid and substantially uniform heat exchange purposes so as to cause substantially uniform percipitattion or solution throughout each space 45 or 47 as desired.

One manner of joining the packing elements within a space 45 or 47 together and to the respective coil 46 or 48 is to coat all of the parts with a relatively low melting metal or alloy and then raise the temperature to the fusion point of the metal or alloy to cause the parts to join together. It will, of course, be understood that the melting point of the metal or alloy should be higher than the operating temperature of the column at the point or points where the metal or alloy is employed. Any other means may be employed for joining the packing elements together and to coils 46 or 48, such as raising the temperature to the fusion point, particularly when the parts are made of glass, or by flowing a fused metal or alloy through the parts to be joined.

If desired, the oil may be introduced into the column at any of the inlets 43 instead of at 42. This might be the uppermost inlet 43 in which case the original oil would flow through the entire precipitating zone.

If desired, reflux of oil may be caused in the solution zone by decreasing the temperature at a point or points in the direction of solvent flow or by introducing a precipitating liquid at a point or points downstream of the solvent flow to throw a part of the dissolved oil out of solution with the solvent.

When the oil is lighter than the solvent and sidestreams of oil are desired rather than sidestreams of solvent, it may be desired to reverse the construction of the tower 38 or, figuratively speaking, to turn it upside down, in which case all of the feeding points and withdrawal points will remain the same.

Figure 8:
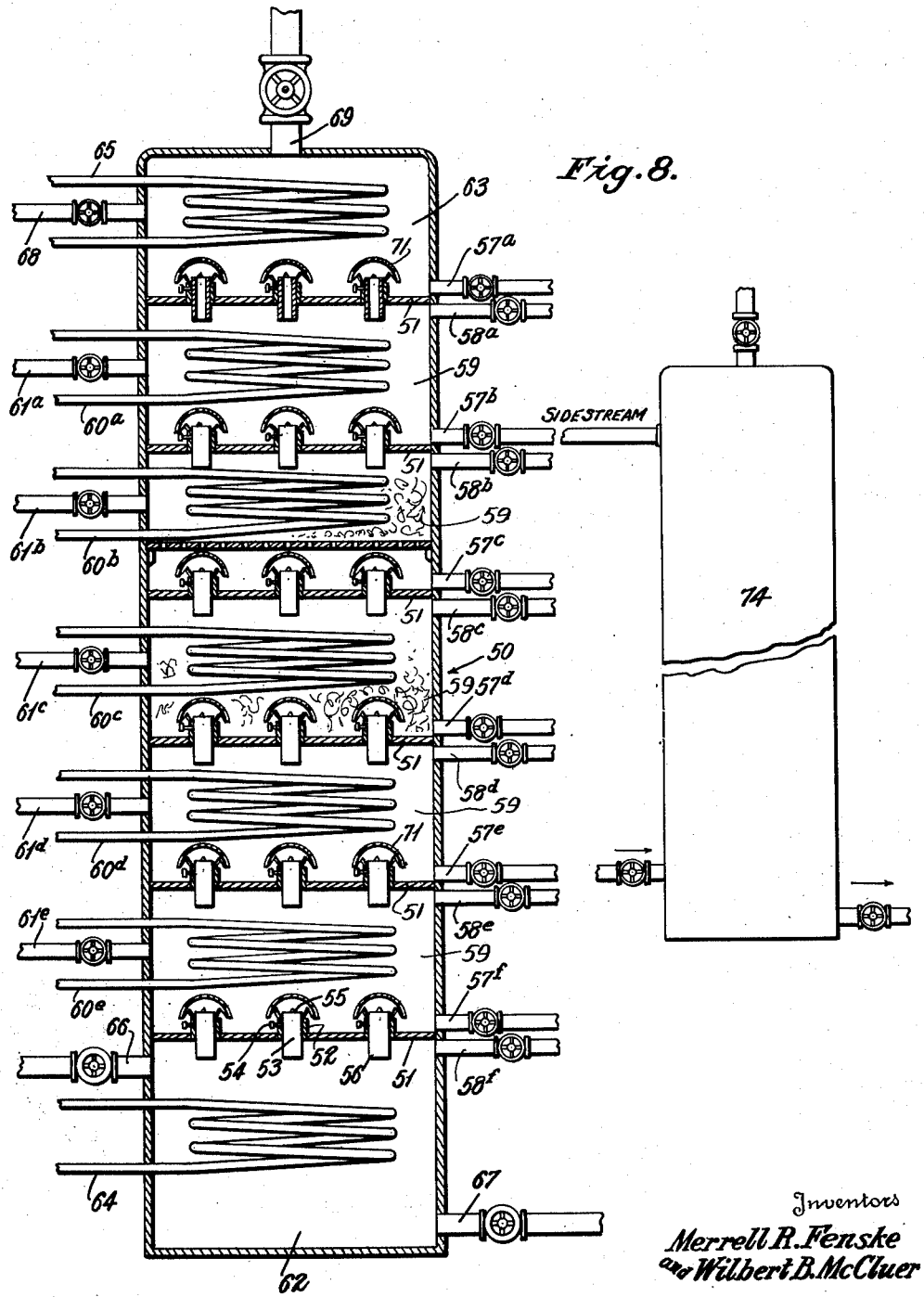
Figure 8 is a diagrammatic illustration of a still further form of tower.

If it is desired to embody in a single tower a construction adapted for universal use, regardless of the relative densities of the liquids employed, a construction such as that shown in Figure 8 might be adopted. Tower 50 as shown has a plurality of spaced plates 51. Each tube 52 of each plate 51 is shown fitted with a tube, sleeve or collar 53. Tubes 53 are preferably of uniform length and preferably closely fit the inner walls of tubes 52. Any suitable means may be employed for holding tubes 53 in place such as the set screws 54. The upper edges 55 of the tubes 53 of each plate 51 are preferably brought into substantially the same horizontal plane which automatically brings the lower edges 56 of the respective tubes 53 into substantially the same horizontal plane.

An outlet 57 and an outlet 58 (respectively followed by distinguishing letters) are shown provided on opposite sides of and adjacent to each plate 51 for the purpose of taking off sidestreams.

Each of the spaces 59 between adjacent plates 51 is shown provided with a heat exchange coil 60 and an inlet 61. Chambers 62 and 63 at the bottom and top respectively of tower 50 are shown with a heat exchange coil 64 and 65 respectively. Chamber 62 is shown with an inlet 66 and an outlet 67, and chamber 63 is shown with an inlet 68 and an outlet 69.

Tower 50 (as well as the other towers herein) is shown with a limited number of plates, inlets, outlets, and accessory devices merely for the purposes of illustration. It is to be understood that this tower or any of the other towers disclosed herein will lend itself to any desired dimensions, size and design which are preferably consistent with good engineering practice.

When the oil is heavier than the solvent, the solvent will generally be fed into the column at 66. In this case oil may be fed into the column at any one of the openings 61e, 61d, 61c, 61b, 61a, or 68.

Let it be assumed that the oil is fed into the column at 61c in which case solution between oil and solvent will take place between the openings 61c and 66.

Since solution is the objective, coils 60e and 60d when used will generally be employed for heating purposes unless, of course, a certain degree of reflux between the openings 61c and 66 is desired, in which case either or both of the coils 60e and 60d or any other coil or coils or heat exchange means in this zone might be used to cause precipitation, for instance, the coil 60d.

Sidestreams of oil might be withdrawn at 57e and 57f and/or sidestreams of solvent might be withdrawn at 58e and/or 58d, or at any other point or points in this zone depending on the size of the column.

The purpose of withdrawing sidestreams of oil might be to obtain raffinates or fractions of different degrees of improvement. Either one would change the solvent to oil ratio as will be obvious.

It should be noted that a second solvent might be introduced through the openings 61e and/or 61d or any other opening or openings depending on the size of the column, or different solvents might be introduced at two or more of such points, or by the introduction of the same solvent at one or more of such points as that introduced at 66 the solvent to oil ratio might be increased along the column.

If a second solvent were introduced along the column, say, for instance, at 61d, the oil would meet two different solvent conditions in the column. Referring to the solvent introduced at 66 as solvent A and to that introduced at 61d as solvent B, the oil introduced at 61c will be first treated by a mixture of solvent A and solvent B and then (between openings 66 and 61d) by solvent A alone. This same operation is possible with the forms shown in Figures 6 and 7.

Solvent B may or may not cause precipitation of the oil and/or may or may not be selective as to the same type and/or size of molecule as solvent A.

If solvent A were selective as to type of molecule and solvent B were selective as to size of molecule, we should expect that the oil withdrawn at 67 would not only have a larger part of the less valuable compounds removed but would also have a larger part of the lower boiling compounds removed.

In the example under consideration, coil 64 would generally be inoperative. However, if coil 64 were in the solvent layer it might be employed to heat the solvent or if coil 64 were in the oil layer it might be employed to chill the oil to throw any desired portion of its dissolved solvent out of solution with the oil so that this solvent might be returned directly to the sphere of solution.

Any one or more of the coils 60c, 60b, 60a and 65 or other similar coil or coils depending on the size of the column might be used for precipitation purposes and any of the openings 61b, 61a and 68 or other similar opening or openings might be employed for introducing a precipitant.

Sidestreams of precipitated oil might be withdrawn at 57c, 57b and 57a, or at any other similar point or points depending on the size of the column and sidestreams of light solution might be withdrawn at 58c, 58b and 58a, or at any other point or points.

The oil might be fed in at any other point, for instance, at 68 (or at any one or more of the openings 68, 61a, 61b, 61c, 61d, 61e, or other similar opening or openings depending on the size of the column), in which case the sidestreams might be taken off in the same or in any other manner. The chief difference would be that the original oil would be mixed with precipitate.

The caps at 71 function primarily for causing the countercurrently flowing fluids to collect about and overflow the ends of tubes 53 each of which functions as a pair of weirs arranged back to back. Therefore, any other construction may be provided for this purpose. When the caps 71 are employed they may also serve for contact purposes. The same applies to the caps of the other forms of the invention disclosed herein. Should the upwardly flowing fluid (whether liquid or vapor) tend to flow directly into the bottoms of tubes 53 after flowing out around the caps 71, inverted caps might be placed over the lower ends of tubes 53. These caps may function with or without the contact feature. Any other means might be provided to cause the liquids to collect on the plates 51 and to overflow the ends of tubes

53, care being taken to avoid locking or trapping liquid phases against flow as above pointed out.

Should the solvent be heavier than the oil, it might be fed into the column at 68 instead of at 66. In this case the column might be operated in a reverse manner from that previously described, that is, for instance, with solution between oil and solvent being effected between openings 68 and 61c, with or without reflux, and with the major precipitation and the taking off of sidestreams taking place between openings 61c and 66.

Different ways of operating the column 50 will suggest themselves to persons skilled in the art upon becoming familiar herewith.

For instance, column 50 as well as column 36 and 10a might be operated in a manner so that a counter flow of solvents is obtained with the oil entering at an intermediate point.

If one solvent were selective as to one type of molecule and the other as to another type, one of the solutions (taken off at the opposite ends) would have a preponderance of one type of molecule and the other solution of the other type of molecule.

It is to be understood that any one or more of the sidestreams may be further treated with solvent for extraction and/or fractionation or other purposes. This may be accomplished, for instance, by running any sidestream to be treated into a separate side tower of any desired type, for instance, any one of the towers disclosed herein. The point of feed of the sidestream into the tower will be generally dependent upon the relative specific gravity of the sidestream as compared to that of the solvent or solvents to be used for treatment purposes in the side tower having in mind the description herein of the operation of the type of tower employed.

This is illustrated, for instance, in Figure 8 wherein 74 is a tower of the type shown in Figure 1. Since any sidestream taken off at 51b (whether of oil or solvent depending on the operation of tower 50) will be relatively heavy as far as the operation of tower 50 is concerned, such sidestream is illustrated as entering tower 74 at the top for the purposes of illustration, although it is to be understood that if such sidestream is relatively lighter than the treating fluid in tower 74, such sidestream would generally be introduced at the bottom.

Any one or more of the other towers disclosed herein might also be used as side towers and the point of feed of each sidestream into its respective side tower will depend upon the treatment to be effected therein, as will be obvious.

The term solvent as used herein includes any compound or compounds whether in the vapor, liquid and/or solid phase and regardless of its influence upon the material under treatment.

While the invention has been particularly described in connection with the treatment of mineral oils, it may also be applied to the treatment of materials in general whether or not the more valuable, the less valuable or an equally valuable material is separated from the material under treatment.

The column may be operated at any desired pressure. This pressure may be atmospheric, particularly if the solvents are liquid at atmospheric pressure, or elevated, particularly if this is necessary to maintain one or more of the solvents in the liquid phase (partially or wholly as desired) while in the column, or reduced should this be desirable for any reason, for instance, to bring a part or all of the solvent or solvents into the vapor phase.

The solvents employed may comprise a single or a plurality of compounds. When a plurality of compounds are employed, these may be miscible or partially miscible. A plurality of non-miscible solvents might also be employed.

When a plurality of solvent compounds are employed, these may be fed into the column in any desired manner at any desired point or points, for instance, together, or one or more might be fed into the column along with the oil, or one or more solvents might be fed into the column at any other point or points.

The term metering device as used in the specification and in the claims is intended to mean a member adapted for the flow of a fluid therethrough and having an inlet capable of proportioning said flow with respect to the flow through other metering devices similarly located. The term necessarily includes a construction about the inlet capable of permitting flow of the fluid into the inlet and necessarily excludes any construction which locks the fluid against flow into said inlet.

Although certain forms of the invention have been particularly described herein, it is to be strictly understood that changes, omissions, additions, substitutions and/or modifications other than those specifically mentioned may be made without departure from the spirit thereof. The claims, therefore, are intended to be limited only as required by the prior art.

We claim:

1. A tower, vertically spaced laterally extending plates in said tower, each plate having a plurality of vertically arranged tubes spaced laterally of said tower, a vertically adjustable collar slidably engaging each tube and adapted to project beyond at least one end thereof, and means for securing each collar in adjusted position to hold each projecting end in a desired horizontal plane.

2. A tower, vertically spaced plates in said tower, a plurality of vertically arranged tubes in said plates, said tubes spaced laterally of said tower, a second plurality of tubes, said second tubes being supported within and projecting beyond the ends of said first tubes with the upper and lower edges of said second tubes on any one plate being in substantially the same horizontal planes at the top and bottom and with the lower edges of said second tubes of any plate ending at points higher than the upper edges of the second tubes of any adjacent lower plate and packing elements between said plates, said packing elements being substantially uniformly distributed laterally of said tower.

3. A tower, vertically spaced plates in said tower, a plurality of vertically arranged tubes in said plates, said tubes spaced laterally of said tower, a second plurality of tubes, said second tubes being supported within and projecting beyond the ends of said first tubes with the upper and lower edges of said second tubes on any one plate being in substantially the same horizontal planes at the top and bottom, a plurality of openings intermediate the top and bottom of said tower, certain of said openings being adjacent the plates thereof, packing elements between said plates, said packing elements being substantially equally distributed laterally of said tower, and heat exchange means associated with said tower between at least one pair of plates thereof.

4. A tower comprising, an upright shell, a plurality of vertically spaced laterally arranged plates in said shell having peripheries contacting the inner surface thereof, a plurality of upright open-ended tubes passing through each plate, packing elements arranged laterally of said tower intermediate said plates, and heat exchange means associated with the packing elements intermediate at least one pair of adjacent plates, said packing elements being integrally joined to each other and to the outer surface of said heat exchange means.

5. A tower comprising, an upright shell, a plurality of vertically spaced laterally arranged plates in said shell, a plurality of upright open-ended tubes in each plate, metallic packing elements arranged laterally of said tower intermediate at least one pair of plates, and heat exchange means associated with said packing elements, said packing elements being integrally joined to each other.

6. A tower, vertically spaced laterally extending plates in said tower, a plurality of upright open-ended tubes in said plates spaced laterally of said tower, said tubes being fixed in said plates, and adjustable means on each tube for adjusting the weir capacity of said tube with respect to the weir capacity of the other tubes.

7. Apparatus adapted for the countercurrent contact of liquid phases comprising a tower, a plurality of vertically spaced laterally arranged plates in said tower, and tubular metering devices extending through and above and below each plate through which the counterflowing liquids are metered thereby, said tubular metering devices and the coacting tower elements being constructed and arranged to insure countercurrent contacting flow of different gravity liquids through each of said tubular metering devices.

8. Apparatus adapted for the countercurrent contact of liquid phases comprising a tower, a plurality of vertically spaced laterally arranged plates in said tower, and tubular metering devices extending through and above and below each plate through which the counterflowing liquids are metered thereby, said tubular metering devices and the coacting tower elements being constructed and arranged to insure countercurrent contacting flow of different gravity liquids through each of said tubular metering devices, said tubular metering devices projecting beyond the upper and lower surfaces of said plates to cause said phases to form layers respectively on opposite sides of each plate from which layers said metering devices are fed by overflow.

9. A tower comprising an upright shell, a plurality of vertically spaced plates in said shell, a plurality of tubular metering devices extending through and above and below each plate through which the counterflowing liquids are metered thereby, said tubular metering devices and the coacting tower elements being so constructed and arranged as to insure countercurrent contacting flow of different gravity liquids through each of said tubular metering devices, said plates forming with said shell imperforate partitions except for the passages formed by said tubular metering devices, and packing elements arranged laterally of said tower intermediate said plates.

MERRELL R. FENSKE.
WILBERT B. McCLUER.